United States Patent
Foutch et al.

(10) Patent No.: US 9,810,158 B2
(45) Date of Patent: Nov. 7, 2017

(54) BLEED AIR SYSTEMS FOR USE WITH AIRCRAFT AND RELATED METHODS

(71) Applicant: The Boeing Company, Chicago, IL (US)

(72) Inventors: David W. Foutch, Seattle, WA (US); Steve G. Mackin, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 669 days.

(21) Appl. No.: 14/242,570

(22) Filed: Apr. 1, 2014

(65) Prior Publication Data
US 2015/0275769 A1    Oct. 1, 2015

(51) Int. Cl.
*F02C 9/18*   (2006.01)
*F02C 3/10*   (2006.01)
(Continued)

(52) U.S. Cl.
CPC .................. *F02C 9/18* (2013.01); *F02C 3/10* (2013.01); *F02C 7/047* (2013.01); *F02C 7/27* (2013.01);
(Continued)

(58) Field of Classification Search
CPC ...... F02C 3/10; F02C 3/34; F02C 6/04; F02C 6/06; F02C 6/08; F02C 7/26; F02C 6/268;
(Continued)

(56) References Cited

U.S. PATENT DOCUMENTS

| 2,800,002 A | 7/1957 | Seed |
| 4,015,438 A | 4/1977 | Kinsell et al. |

(Continued)

FOREIGN PATENT DOCUMENTS

| CA | 2773229 | 5/2011 |
| CN | 102596719 | 7/2012 |

(Continued)

OTHER PUBLICATIONS

Office Action, issued by the United States Patent and Trademark Office in connection with U.S. Appl. No. 12/614,441, dated Jul. 3, 2014, 24 pages.

(Continued)

*Primary Examiner* — Pascal M Bui Pho
*Assistant Examiner* — Marc Amar
(74) *Attorney, Agent, or Firm* — Henley, Flight & Zimmerman, LLC

(57) ABSTRACT

Bleed air systems for use with aircraft and related methods are disclosed. An example apparatus includes a compressor having a compressor inlet, a compressor outlet, and a first drive shaft. The compressor outlet is to be fluidly coupled to a system of an aircraft that receives pressurized air, and the compressor inlet is to receive bleed air from a low-pressure compressor of an engine of the aircraft. The example apparatus includes a gearbox operatively coupled to the first drive shaft to drive the compressor. The gearbox is to be operatively coupled to and powered by a second drive shaft extending from the engine. The example apparatus also includes a clutch disposed between the first drive shaft and the gearbox to selectively disconnect the first drive shaft from the gearbox.

15 Claims, 8 Drawing Sheets

(51) Int. Cl.
*F02C 7/047* (2006.01)
*F02C 7/27* (2006.01)
*F02C 7/32* (2006.01)
*B64D 13/06* (2006.01)

(52) U.S. Cl.
CPC .......... *F02C 7/32* (2013.01); *B64D 2013/064* (2013.01); *B64D 2013/0648* (2013.01); *Y02T 50/671* (2013.01)

(58) Field of Classification Search
CPC ...... F02C 6/27; F02C 6/32; F02C 6/36; F02C 9/18; B64D 2013/0603; B64D 2013/0607; B64D 2013/0618; B64D 2013/0648; B64D 2013/0696
See application file for complete search history.

(56) References Cited

U.S. PATENT DOCUMENTS

| | | | |
|---|---|---|---|
| 4,262,495 | A | 4/1981 | Gupta et al. |
| 4,487,034 | A | 12/1984 | Cronin et al. |
| 4,503,666 | A | 3/1985 | Christoff |
| 4,684,081 | A | 8/1987 | Cronin |
| 5,036,678 | A | 8/1991 | Renninger et al. |
| 5,114,100 | A | 5/1992 | Rudolph et al. |
| 5,143,329 | A | 9/1992 | Coffinberry |
| 5,363,641 | A * | 11/1994 | Dixon ................. F02C 6/08 60/226.1 |
| 5,414,992 | A | 5/1995 | Glickstein |
| 5,524,848 | A | 6/1996 | Ellsworth |
| 5,813,630 | A | 9/1998 | Williams |
| 5,899,805 | A | 5/1999 | Dowd et al. |
| 5,967,461 | A | 10/1999 | Farrington |
| 6,189,324 | B1 | 2/2001 | Williams et al. |
| 6,305,156 | B1 * | 10/2001 | Lui ................. B64D 13/06 454/76 |
| 6,401,473 | B1 | 6/2002 | Ng et al. |
| 6,491,254 | B1 | 12/2002 | Walkinshaw et al. |
| 6,526,775 | B1 | 3/2003 | Asfia et al. |
| 6,629,428 | B1 | 10/2003 | Murry |
| 6,681,592 | B1 | 1/2004 | Lents et al. |
| 6,688,558 | B2 | 2/2004 | Olsen et al. |
| 6,796,131 | B2 | 9/2004 | Sampson |
| 6,942,183 | B2 | 9/2005 | Zywiak |
| 6,971,241 | B2 | 12/2005 | Critchley et al. |
| 6,997,013 | B2 | 2/2006 | Jones |
| 7,207,521 | B2 | 4/2007 | Atkey et al. |
| 7,246,482 | B2 * | 7/2007 | Mahoney .............. F02C 3/13 60/204 |
| 7,467,524 | B2 | 12/2008 | Brutscher et al. |
| 7,607,318 | B2 | 10/2009 | Lui et al. |
| 7,618,008 | B2 | 11/2009 | Scherer et al. |
| 7,727,057 | B2 | 6/2010 | Beier et al. |
| 7,871,038 | B2 | 1/2011 | Space et al. |
| 8,047,470 | B2 | 11/2011 | Porte |
| 8,063,501 | B2 | 11/2011 | Finney |
| 8,529,189 | B2 | 9/2013 | Brown et al. |
| 8,955,794 | B2 | 2/2015 | Mackin et al. |
| 9,163,562 | B2 | 10/2015 | Suciu et al. |
| 2001/0032472 | A1 | 10/2001 | Buchholz et al. |
| 2003/0005718 | A1 | 1/2003 | Mitani et al. |
| 2003/0051492 | A1 | 3/2003 | Hartenstein et al. |
| 2003/0177781 | A1 | 9/2003 | Haas et al. |
| 2004/0172963 | A1 | 9/2004 | Axe et al. |
| 2005/0051668 | A1 | 3/2005 | Atkey et al. |
| 2006/0272313 | A1 | 12/2006 | Eick et al. |
| 2008/0314060 | A1 | 12/2008 | Parikh |
| 2009/0277445 | A1 | 11/2009 | Markwart |
| 2009/0314002 | A1 | 12/2009 | Libera et al. |
| 2010/0107594 | A1 | 5/2010 | Coffinberry et al. |
| 2011/0107777 | A1 | 5/2011 | Atkey et al. |
| 2012/0111022 | A1 | 5/2012 | Dyer |
| 2012/0186267 | A1 | 7/2012 | Coffinberry et al. |
| 2013/0098059 | A1 | 4/2013 | Suciu et al. |
| 2013/0187007 | A1 | 7/2013 | Mackin et al. |
| 2015/0121842 | A1 | 5/2015 | Moes |
| 2015/0275758 | A1 | 10/2015 | Foutch et al. |

FOREIGN PATENT DOCUMENTS

| | | |
|---|---|---|
| DE | 102006042584 | 3/2008 |
| EP | 2470425 | 7/2012 |
| JP | 2013510042 | 3/2013 |
| WO | 9920528 | 4/1999 |
| WO | 0037313 | 6/2000 |
| WO | 0123724 | 4/2001 |
| WO | 2007093389 | 8/2007 |
| WO | 2011056285 | 5/2011 |

OTHER PUBLICATIONS

Final Rejection, issued by the United States Patent and Trademark Office in connection with U.S. Appl. No. 12/614,441, dated Jan. 3, 2014, 22 pages.

Advisory Action, issued by the United States Patent and Trademark Office in connection with U.S. Appl. No. 12/614,441, dated May 22, 2014, 3 pages.

Notice of Allowance and Fee(s) Due, issued by the United States Patent and Trademark Office in connection with U.S. Appl. No. 12/614,441, dated Dec. 5, 2014, 7 pages.

Notice of Allowance and Fee(s) Due, issued by the United States Patent and Trademark Office in connection with U.S. Appl. No. 13/357,293, dated Sep. 30, 2014, 8 pages.

Notice of Allowance and Fee(s) Due, issued by the United States Patent and Trademark Office in connection with U.S. Appl. No. 13/951,181, dated Sep. 30, 2014, 14 pages.

Communication Pursuant to Article 94(3) EPC, issued by the European Patent Office in connection with European Patent Application 13152433.2, dated Oct. 28, 2015, 4 pages.

United States Patent and Trademark Office, "Non-Final Office Action," issued in connection with U.S. Appl. No. 14/632,322, dated Aug. 12, 2016, 21 pages.

Extended European Search Report, issued by the European Patent Office in connection with European Patent Application No. 14175279.0 dated Dec. 3, 2014, 9 pages.

Office Action, issued by the United States Patent and Trademark Office in connection with U.S. Appl. No. 13/951,181, dated Apr. 16, 2014, 9 pages.

14 C.F.R. Part 25.831 effective as of Jan. 21, 1997, last retrieved from http://www.airweb.faa.gov/Regulatory_and_Guidance_Library%5CrgFAR.nsf/0/E84799D57F7D41DF852566720051B01D?OpenDocument on Aug. 2, 2013, 3 pages.

International Searching Authority, "International Search Report," issued in connection with International No. PCT/US2010/047357, dated Dec. 3, 2010, 5 pages.

International Searching Authority, "Written Opinion of the International Searching Authority," issued in connection with International Application No. PCT/US2010/047357, dated Dec. 3, 2010, 5 pages.

The United States Patent and Trademark Office, "Office Action," issued in connection with U.S. Appl. No. 12/614,441, dated Apr. 26, 2013, 21 pages.

International Bureau, "International Preliminary Report on Patentability," issued in connection with International Application No. PCT/US2010/047357, dated May 8, 2012, 6 pages.

European Patent Office, "Communication Under Rule 71(3) EPC," issued in connection with European Application No. 10 750 0141.2-1753, dated Jun. 28, 2013, 5 pages.

The United States Patent and Trademark Office, "Requirement for Restriction/Election," issued in connection with U.S. Appl. No. 13/357,293, dated Sep. 25, 2013, 5 pages.

The United States Patent and Trademark Office, "Non-Final Office Action," issued in connection with U.S. Appl. No. 13/357,293, dated Feb. 7, 2014, 21 pages.

United States Patent and Trademark Office, "Non-Final Office Action," issued in connection with U.S. Appl. No. 14/242,493, dated Mar. 20, 2017, 63 pages.

(56) References Cited

OTHER PUBLICATIONS

United States Patent and Trademark Office, "Notice of Allowance and Fee(s) Due," issued in connection with U.S. Appl. No. 14/632,322, dated Apr. 17, 2017, 17 pages.
United States Patent and Trademark Office, "Restriction and/or Election Requirement," issued in connection with U.S. Appl. No. 14/242,493, dated Dec. 6, 2016, 9 pages.

* cited by examiner

BLEED AIR SYSTEMS FOR USE WITH AIRCRAFT AND RELATED METHODS

FIELD OF THE DISCLOSURE

The present disclosure relates generally to aircraft and, more particularly, to bleed air systems for use with aircraft and related methods.

BACKGROUND

Commercial aircraft typically employ an environmental control system to pressurize a passenger cabin of the aircraft and/or thermal anti-icing systems to provide heated air for anti-icing applications. Air supply is typically provided to these systems by bleed air extracted from or provided by a compressor of an aircraft engine. To meet the pressure and/or temperature demands of the various aircraft systems, bleed air is often extracted from a higher stage of the compressor that provides bleed air having a pressure and/or temperature above that demanded by the various systems. For example, bleed air is often extracted from a mid-stage of a high pressure compressor of an aircraft engine. The pressurized bleed air is then often cooled, via a precooler, and reduced in pressure, via a pressure regulating valve, prior to providing the bleed air to a system (e.g., an environmental control system) of the aircraft. Therefore, much of the energy spent by the engine to produce the bleed air is wasted when cooling the bleed air and/or reducing the pressure of the bleed air and, thus, extracting high-pressure bleed air in such a manner may reduce the efficiency of the engine.

To reduce extraction of bleed air, some known systems employ a turbo-compressor that receives ambient air from an atmospheric inlet. The turbo-compressor pressurizes the ambient air prior to supplying the various aircraft systems. However, the atmospheric inlet produces drag. Additionally, the atmospheric inlet is often susceptible to icing and, thus, requires an anti-icing system that increases costs and system complexity. Further, the compressor may have to be relatively large to produce a pressure change sufficient to power the systems of an aircraft. Some known piston engines provide pressurized air for an aircraft cabin environmental control system with a shaft-driven compressor, typically known as a supercharger. Known shaft-driven superchargers also receive ambient air from an atmospheric inlet and, thus, also suffer from the above-identified drawbacks.

SUMMARY

An example apparatus includes a compressor having a compressor inlet, a compressor outlet, and a first drive shaft. The compressor outlet is to be fluidly coupled to a system of an aircraft that receives pressurized air, and the compressor inlet is to receive bleed air from a low-pressure compressor of an engine of the aircraft. The example apparatus includes a gearbox operatively coupled to the first drive shaft to drive the compressor. The gearbox is to be operatively coupled to and powered by a second drive shaft extending from the engine. The example apparatus also includes a clutch disposed between the first drive shaft and the gearbox to selectively disconnect the first drive shaft from the gearbox.

Another example apparatus includes a turbo-compressor including a compressor having a compressor inlet and a compressor outlet. The compressor outlet is fluidly coupled to a system of an aircraft, and a turbine is operatively coupled to the compressor via a first drive shaft. The example apparatus also includes a gearbox operatively coupled to the first drive shaft of the turbo-compressor and a second drive shaft operatively coupled to the gearbox to power the gearbox. The second drive shaft is to be operatively coupled to an engine of the aircraft.

An example method includes coupling a first drive shaft of a turbo-compressor to a gearbox, the turbo-compressor comprising a compressor and a turbine operatively coupled via the first drive shaft, coupling the gearbox to a second drive shaft extending from an aircraft engine, and fluidly coupling a compressor outlet of the compressor to a system of an aircraft that is to receive pressurized air.

The features, functions and advantages that have been discussed can be achieved independently in various embodiments or may be combined in yet other embodiments further details of which can be seen with reference to the following description and drawings.

Figure 1:
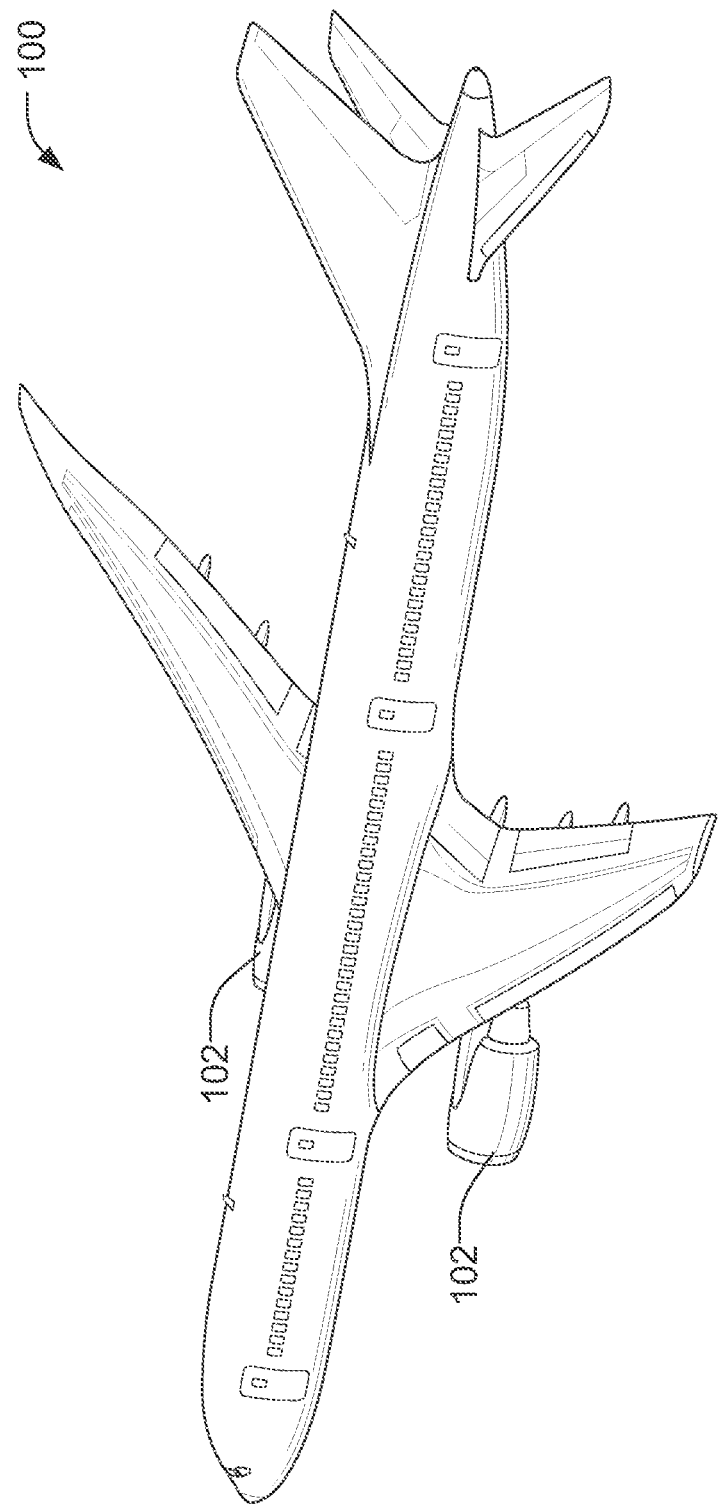
FIG. 1 is an illustration of an example aircraft that may embody the examples described herein.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Engine bleed air is typically provided by a compressor of an aircraft engine to power various systems of an aircraft. For example, bleed air is often used to power an environmental control system (ECS) and/or a thermal anti-icing system of the aircraft. The bleed air is bled from a compressor of the aircraft engine via a bleed port in a housing of the compressor. However, bleed air pressures vary greatly with operating conditions such as, for example, engine speed, operating altitude, etc.

To ensure the bleed air has sufficient pressure and/or temperature to power the various systems of the aircraft, the bleed air is often extracted from a bleed air port of a compressor such as, for example, from a lower stage of a high-pressure compressor, that provides bleed air with a pressure above the pressure demanded by the systems. In some instances, bleed air is also provided by a higher-pressure bleed air port when the pressure of the low-pressure bleed air is insufficient to supply the systems. For example, bleed air is often extracted from a mid or intermediate stage (e.g., a fifth stage) of a high pressure compressor of an aircraft engine during high engine speeds and from a discharge or final stage (e.g., a tenth stage) of the high pressure compressor during high altitude and/or low engine speed operations. Much of the energy spent by the engine to produce the bleed air may be wasted if not completely used.

The bleed air extracted from the engine often exceeds a temperature threshold of the aircraft systems utilizing the bleed air. Thus, the bleed air may be cooled prior to supplying the bleed air to, for example, the ECS. To reduce the bleed air temperature, commercial aircraft typically employ a heat exchanger (e.g., a precooler) through which bleed air passes and which is typically located on a pylon adjacent to the engine. A fan operated by the engine of the aircraft provides cool air to the precooler to cool the bleed air prior to supplying the bleed air to the systems of the aircraft. The fan air is often dumped overboard after flowing through the precooler. Therefore, cooling the bleed air via the fan reduces the efficiency of the aircraft engine. Additionally, the precooler typically has a relatively large dimensional envelope, which adds extra weight and may require a fan air scoop and exhaust that produce drag. Thus, the relatively large dimensional envelope of the precooler can also affect the efficiency of the aircraft engine.

Additionally, the bleed air extracted from the engine often exceeds a pressure threshold of the aircraft systems utilizing the bleed air. Thus, the pressure of the bleed air may be reduced prior to supplying the bleed air to, for example, the ECS. To reduce the bleed air pressure, commercial aircraft typically employ one or more pressure regulating valves through which bleed air passes. Thus, a substantial amount of the energy spent by the engine to produce the bleed air is wasted when cooling the bleed air and/or reducing the pressure of the bleed air. This wasted energy results in greater fuel consumption.

In some known bleed air systems, compressed air is provided to the various systems of the aircraft via electrically driven compressors. However, electrically driven compressors may not be efficient for relatively smaller aircraft. In other known examples, a bleed air system employs a turbo-compressor or shaft-driven supercharger that receives ambient air from an atmospheric inlet. However, the atmospheric inlet produces drag. Further, the turbo-compressor or shaft-driven supercharger may be relatively large and may use a relatively large amount of power to compress the ambient air from its relatively lower pressure to a pressure sufficient to meet the demands of the aircraft systems. Additionally, the atmospheric inlet is often susceptible to icing and, thus, may require an anti-icing system that increases costs and system complexity.

Additionally, some known shaft-driven superchargers, which are in direct connection with the aircraft engine, may only be able to supply sufficient bleed air to the systems when the engine is operating at a higher speed. In such an instance, another bleed air system is typically utilized to supply bleed air at lower operating speeds. Also, some known example turbo-compressors utilize bleed air from the high-pressure compressor of the engine to power the turbine of the turbo-compressor. However, the turbo-compressor is typically less efficient than a shaft-driven supercharger. Further, the bleed air used to operate the turbine is then typically dumped overboard and, thus, more bleed air is wasted.

Example bleed air systems and related methods disclosed herein employ a turbo-compressor having a compressor that is capable of being driven by a turbine of the turbo-compressor, via a first or primary drive shaft, and/or by a second or secondary drive shaft (e.g., a radial drive shaft) operatively coupled to the aircraft engine to provide compressed or pressurized air to various systems of an aircraft such as, for example, an environmental control system (ECS), a thermal anti-icing system (e.g., a wing and/or engine, anti-icing system), a pneumatic supply system (to supply pneumatic devices), and/or any other system of the aircraft that requires use of compressed air. Unlike known systems, the example compressor of the turbo-compressor extracts or diverts bleed air from a relatively lower pressure bleed air port of the aircraft engine and pressurizes the bleed air to meet (e.g., but not exceed) the demand(s) of the systems of the aircraft. As a result, less energy is used by the bleed air systems during a significant number of flight conditions. Additionally, unlike known systems, the compressor is capable of being powered by either the secondary drive shaft of the aircraft engine and/or by the turbine of the turbo-compressor, both of which are more efficient than known bleed air systems.

The compressor of the turbo-compressor in the example bleed air systems disclosed herein is coupled to a gearbox that is powered by the secondary drive shaft. The secondary drive shaft is operatively coupled to and driven by a main or third drive shaft (e.g., a high-pressure compressor drive shaft) of the aircraft engine. Depending on the operating condition of the aircraft engine and/or the demand of the systems of the aircraft, the power from the secondary drive shaft may be used to power the compressor to provide pressurized air to the systems of the aircraft. Additionally, by extracting bleed air having relatively lower pressure (below that demanded the systems of the aircraft) and increasing the pressure of the bleed air via the secondary drive shaft to just meet the demands of the systems, less energy in the bleed air is wasted (e.g., by use of a pressure regulating valve), which significantly reduces the specific fuel consumption of the engine. Therefore, the compressor may be driven by the secondary drive shaft coupled directly to the aircraft engine and, thus, is more efficient than other known bleed air systems.

In the example bleed air systems and methods disclosed herein, the compressor may additionally or alternatively be powered by the turbine of the turbo-compressor. For example, when the aircraft is operating in a condition (e.g., at idle) that my not supply sufficient power to the secondary drive shaft and gearbox to operate the compressor, the turbine of the turbo-compressor may be used to power the compressor to provide pressurized air to the systems of the aircraft. In some examples disclosed herein, an inlet of the turbine is fluidly coupled to a bleed port of the high-pressure compressor the engine. The high pressure bleed air powers the turbine and, thus, operates the compressor to supply compressed or pressurized air to the systems of the aircraft. Additionally, unlike known turbo-compressors that pressurize ambient air, the compressor extracts bleed air from the compressor of the engine having relatively lower pressure (below that demanded the systems of the aircraft) and increases the pressure of the bleed air to just meet the demands of the systems. As a result, less energy in the bleed air is wasted (e.g., by use of a pressure regulating valve), which significantly reduces the specific fuel consumption of the engine. Thus, less power from the turbine to power the compressor.

Unlike known systems that employ a turbo-compressor or shaft-driven supercharger that pressurizes ambient air, the example bleed air systems described herein utilize compressed bleed air from a bleed air port of an aircraft engine, thereby drawing less power from the aircraft engine to operate the compressor. In other words, the example bleed air systems increase the pressure of bleed air that has already been at least partially compressed or pressurized by the compressor(s) of the engine and, thus, less energy is used by the secondary drive shaft and/or the turbine to boost the bleed air to the pressure demanded by the systems of the aircraft. Further, unlike known systems that employ a turbo-compressor, the example bleed air systems and related methods described herein enable use of a relatively smaller turbo-compressor.

In some example bleed air systems and methods disclosed herein, a clutch is disposed between the gearbox and the compressor of the turbo-compressor. As mentioned above, the gearbox may be utilized to provide power to the compressor during a majority of the flight mission. However, during certain flight conditions (e.g., at idle), the power supplied to the gearbox by the secondary drive shaft may not be sufficient to operate the compressor to supply pressurized air to the systems of the aircraft. In such an instance, the turbine of the turbo-compressor may be employed to provide power to the compressor. The turbine is capable of providing sufficient power to the compressor during a larger range of flight conditions, including idle. The clutch may be utilized to disconnect (i.e., operatively decouple) the compressor from the gearbox when switching from using the power from the gearbox to using power from the turbine. In some example bleed air systems and methods disclosed herein, a transmission (e.g., a variable speed transmission) is also employed between the gearbox and the clutch. The transmission allows the gearbox to power the compressor of the turbo-compressor during a larger range of flight conditions (e.g., different speeds, altitudes, etc.).

Additionally, instead of utilizing a clutch, some example bleed air systems and methods disclosed herein employ a freewheel between the gearbox and the compressor of the turbo-compressor. In some examples, if the aircraft is operating in a flight condition where the secondary drive shaft and gearbox are not supplying sufficient power to the compressor to meet the demands of a system of the aircraft, the turbine of the turbo-compressor may be utilized to power the compressor. Instead of disconnecting the compressor from the gearbox using a clutch, the freewheel allows the primary drive shaft of the turbo-compressor to spin freely at a higher rate of speed than the output of the gearbox (e.g., the offtake, the power-take-off).

Furthermore, in some example bleed air systems and methods disclosed herein, the turbine of the turbo-compressor is utilized to start the engine of the aircraft. In some examples, a high-pressure air source is fluidly coupled to the inlet of the turbine. As a result, the turbo-compressor, which is operatively coupled to the gearbox (e.g., via a clutch) supplies power to the gearbox and, thus, the secondary drive shaft, which in turn provides power to the main drive shaft of the aircraft engine. Thus, a separate starter turbine is not needed to start the aircraft engine.

The example bleed air systems and related methods disclosed herein may be combined with one or more of the bleed air systems disclosed in U.S. patent application Ser. No. 13/357,293, filed Jan. 24, 2012, entitled "BLEED AIR SYSTEMS FOR USE WITH AIRCRAFTS AND RELATED METHODS," U.S. application Ser. No. 13/951, 181, filed Jul. 25, 2013, entitled "BLEED AIR SYSTEMS FOR USE WITH AIRCRAFTS AND RELATED METHODS," and/or U.S. patent application Ser. No. 14/242,493, filed Apr. 1, 2014, entitled "BLEED AIR SYSTEMS FOR USE WITH AIRCRAFT AND RELATED METHODS," all of which are incorporated herein by referenced in their entireties.

FIG. 1 illustrates an example commercial aircraft 100 having aircraft engines 102 (e.g., turbofan engines) that may embody aspects of the teachings of this disclosure. Each engine 102 of the aircraft 100 may employ a dedicated bleed air system and/or may employ a common bleed air system. In other words, in some examples, the aircraft 100 employs a dedicated bleed air system for each engine 102 and, in other examples, a common bleed air system is employed for all the engines. The bleed air system(s) provides compressed or pressurized air to an aircraft system such as, for example, an ECS and/or a thermal anti-icing system (e.g., an engine and/or wing anti-icing system).

Figure 2:
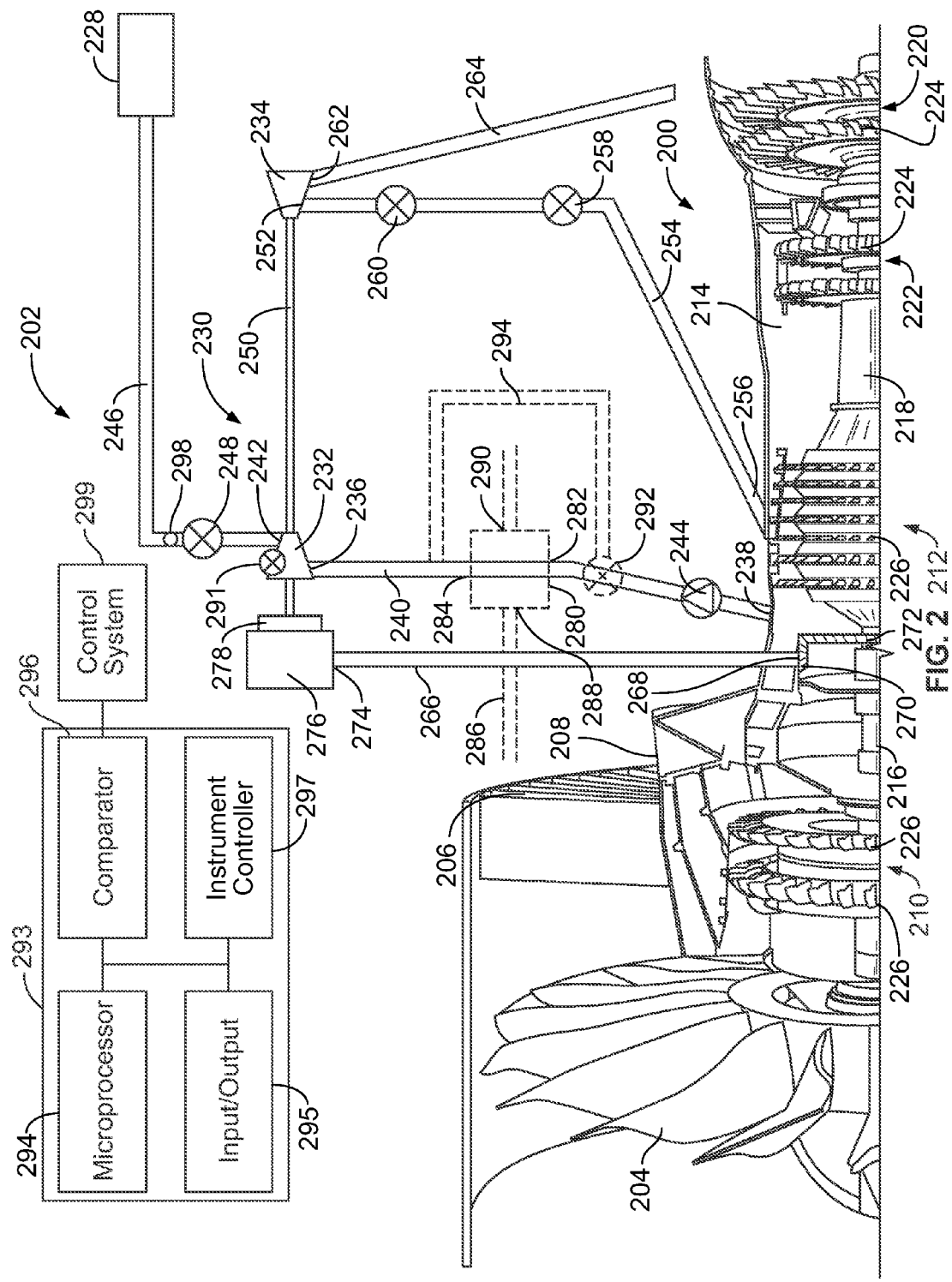
FIG. 2 illustrates an example aircraft engine having an example bleed air system disclosed herein.

FIG. 2 is a partial cutaway view of an engine 200 of an aircraft (e.g., the engine 102 of the aircraft 100) implemented with an example bleed air system 202 in accordance with the teachings of this disclosure. Referring to FIG. 2, the engine 200 is a gas turbine engine having a fan 204 that draws air into a fan duct or compressor intake section 206 and into a compressor 208. The compressor 208 may include multiple compressor sections. For example, as shown, the compressor 208 of the illustrated example is a dual-axial compressor 208 that includes a first compressor 210 and a second compressor 212. Additionally, each of the first and second compressors 210, 212 includes various compressor stages that progressively increase the pressure of the air as the air flowing from the fan duct section 206 to a combustion chamber 214. In the example shown, the first compressor 210 is a low-pressure compressor (LPC) that provides relatively low pressure air and the second compressor 212 is a high-pressure compressor (HPC) that provides relatively high pressure air. The compressors 210, 212 are operatively coupled to respective shafts 216, 218. The first shaft or LPC shaft 216 is operatively coupled to a low-pressure turbine 220 and the second shaft or HPC shaft 218 is operatively coupled to a high-pressure turbine 222. In this example, the compressor 208 is a dual-axial compressor that includes the two compressors 210, 212. However, in other examples, the compressor 208 may include more or fewer compressor sections, each having, for example, a turbine and respective shaft.

After exiting the HPC 212, the highly pressurized air is provided to the combustion chamber 214, where fuel is injected and mixed with the high pressure air and ignited. The high energy airflow exiting the combustion chamber 214 turns blades 224 of the turbines 220, 222, which are coupled to respective ones of the shafts 216, 218. Rotation of the shafts 216, 218 turns blades 226 of the compressors 210, 212. The heated air is exhausted via a nozzle where it mixes with cool air, provided by the fan 204, that bypasses the engine core to produce forward thrust.

To supply various systems of an aircraft with pressurized air, the example bleed air system 202 of the illustrated example diverts or extracts some of the compressed air (e.g., bleed air) from the compressor 208 prior to the combustion chamber 214. The example bleed air system 202 supplies engine bleed air to a system or control system 228 of the aircraft. The system 228 may include, for example, an ECS, an anti-icing system (e.g., a wing anti-icing system, an engine anti-icing system), an air driven hydraulic pump (ADP) and/or any other system of an aircraft that utilizes compressed or pressured air. An ECS, for example, conditions the bleed air provided by the bleed air system 202 to a cabin pressure and/or cabin temperature. The ECS may include, for example, one or more ECS packs (e.g., an air cycle refrigeration system) that receive the bleed air from the bleed air system 202 and conditions or regulates the bleed air to cabin pressure and/or temperature.

In the illustrated example of FIG. 2, the bleed air system 202 includes a turbo-compressor 230 having a compressor 232 and a turbine 234 (e.g., a radial inflow turbine). The compressor 232 of the turbo-compressor 230 receives low-pressure bleed air from a low-pressure source (e.g., a low-pressure stage of a compressor) of the engine 200. The compressor 230 compresses the bleed air and discharges the compressed bleed air to the system 228. The turbine 234 of the illustrated example receives high-pressure bleed air from a high-pressure source (e.g., a high-pressure stage of a compressor) of the engine 200 providing bleed air having a higher pressure than the bleed air provided by the low-pressure source. Thus, the bleed air provided to the turbine 234 has a relatively higher pressure and/or temperature than the pressure and/or temperature of the bleed air provided to the compressor 232. The high-pressure bleed air operates the turbine 234 which, in turn, operates the compressor 232. The turbine 234 discharges the bleed air at a relatively lower pressure and/or temperature, which may be used to supply other sources as described in further detail below.

In the illustrated example, the compressor 232 has a compressor inlet 236 fluidly coupled to a bleed port 238 of the low-pressure compressor 210. A conduit or passageway 240 fluidly couples the bleed port 238 of the low-pressure compressor 210 and the compressor inlet 236. The compressor 232 of the turbo-compressor 230 compresses the bleed air extracted from the low-pressure compressor 210 to provide a relatively higher pressure bleed air at a compressor outlet 242. In some examples, the turbo-compressor 230 is disposed within a nacelle of the engine 102. In other examples, the turbo-compressor 230 may be disposed at a remote location relative to the nacelle or any other suitable location of the aircraft 100.

In some examples, to prevent back flow pressure from entering the bleed port 238 of the low-pressure compressor 210, the bleed air system 202 employs a flow control member or check valve 244 (e.g., a back-flow preventer, a low pressure check valve (LPCV)). The check valve 244 is disposed between the bleed port 238 of the low-pressure compressor 210 and the compressor inlet 236 to prevent pressurized airflow from flowing toward the bleed port 238 when higher pressure air is present in the passageway 240. In other words, if the compressor 232 generates a back pressure at the compressor inlet 236 that is greater than the pressure of the bleed air extracted from the low-pressure compressor 210 of the engine 200, the check valve 244 prevents the higher pressure bleed air from flowing from the compressor inlet 236 into the low-pressure compressor 210.

In the illustrated example, the compressor inlet 236 is fluidly coupled to a low-pressure source such as, for example, a final stage of the LPC 210. However, in other examples, the compressor inlet 236 may be fluidly coupled other stages of the LPC 210 (e.g., an intermediate stage of the LPC 210). Additionally or alternatively, in some examples, the compressor inlet 236 is fluidly coupled to high-pressure source or a stage of the HPC 212. In some such examples, the example bleed air system 202 may include dual-inlet bleed air ports. In that case, a first port provides bleed air to the compressor inlet 236 from a first stage (e.g., an intermediate stage) of the LPC 210 and a second port provides bleed air to the compressor inlet 236 from a second stage (e.g., a final stage) of the low-pressure compressor 210 or a stage (e.g., an intermediate stage) of the HPC 212. In such examples, one or more flow control apparatus or valves are employed to direct the bleed air from either one of the dual ports to the compressor inlet 236. For example, when the engine is operating at a relatively high thrust (e.g., during take-off and/or cruising altitudes), the flow control apparatus may direct bleed air from the low-pressure compressor 210. Alternatively, when the engine is operating at a relatively low thrust (e.g., when idle), the flow control apparatus may direct bleed flow to the compressor inlet 236 from a higher stage of the low-pressure compressor 210 or the high-pressure compressor 212.

In the illustrated example, the compressor 232 compresses the bleed air extracted from the LPC 210 to provide a relatively higher pressure bleed air at the compressor outlet 242, which is fluidly coupled to the system 228 of the aircraft. Specifically, a passageway or conduit 246 fluidly couples the compressor outlet 242 to the system 228. In the example shown, a flow control member 248 is coupled to the passageway 246 and disposed prior to the system 228. For example, the flow control member 248 may be configured to regulate the pressure of the bleed air to a pre-set or predetermined pressure value prior to supplying the bleed air to the system 228 and/or the flow control member 248 may provide fluid flow shut-off (e.g., a pressure-reducing valve (PRV), a pressured-reducing shut off valve (PRSOV), a shut off valve (SOV), a high pressure shut off valve (HPSOV)). Additionally or alternatively, in some examples the flow control member 248 operates as a surge valve to redirect or dump pressurized air flowing from the compressor outlet 242.

To drive the compressor 232, the turbo-compressor 230 employs the turbine 234. The turbine 234 is operatively coupled to the compressor 232 via a drive shaft 250 (e.g., a first drive shaft, a primary drive shaft). To operate the turbine 234 (e.g., during certain flight conditions), a turbine inlet 252 is fluidly coupled to a bleed air source of the engine 200. In particular, in the illustrated example, the turbine inlet 252 is coupled to the HPC 212 of the engine 200. A conduit or passageway 254 fluidly couples a bleed port 256 of the HPC 212 of the engine 200 and the turbine inlet 252. In the example shown, the turbine inlet 252 is fluidly coupled to an intermediate stage (e.g., a third stage) of the HPC 212. However, in other examples, the turbine inlet 252 may be fluidly coupled to any other stage of the HPC 212. Additionally, the turbine inlet 252 may be fluidly coupled to more than one bleed port of the HPC. In some examples, the turbo-compressor 230 includes an oil lubricated bearing for the shaft 250. However, in other examples, the turbo-compressor includes an air bearing system, as described in further detail below in the example bleed air system 600 of FIG. 6.

In the illustrated example, a first flow control member 258 and a second flow control member 260 are coupled to the passageway 254 and are disposed between the bleed air port 256 and the turbine inlet 252. The flow control members 258, 260 may be configured to regulate the pressure of the bleed air to a pre-set or predetermined pressure value and/or provide fluid flow shut-off (e.g., a PRV, a PRSOV, an SOV, a turbine shut off valve (TSOV), a turbo-compressor control valve (TCCV)). In some examples, the first flow control member 258 is an SOV and the second flow control member 260 is a TCCV. In this manner, the first flow control member 258 operates to open and close the passageway 254 to provide bleed air to operate the turbine 234 while the second flow control member 260 operates to control the pressure of the bleed air flowing to the turbine inlet 252. Thus, in some examples, the flow control member 260 is employed to control the pressure of the bleed air supplied to the turbine 234 and, thus, controls the flow rate of the compressor 232. The two flow control member configuration also provides redundancy in the system if one of the flow control members 258, 260 becomes inoperable (e.g., fails open). High-pressure bleed air provided by the HPC 212 drives the turbine 234 which, in turn, drives the compressor 232 via the shaft 250. The turbine 234 converts thermal energy provided by the bleed air of the HPC 212 into mechanical energy by expanding the hot, high-pressure bleed air provided by the HPC 212 to a lower temperature and pressure.

In the illustrated example, a turbine outlet 262 is fluidly coupled to a downstream area via a conduit or passageway 264. In some examples, the bleed air exiting the turbine outlet 262 is delivered to a thermal anti-icing system (e.g., an engine anti-icing system, a wing anti-icing system). Additionally or alternatively, in some examples the bleed air exiting the turbine outlet 262 may be directed onto the turbines 220, 222 and/or the casing of the engine to help cool the engine 200. Cooling the casing and/or the turbine blades, for example, maintains a proper clearance or spacing between the turbine blades and the casing (e.g., prevents shrinkage and/or expansion due to elevated temperatures). In other examples, the air exiting the turbine outlet 262 is dumped overboard to produce thrust (i.e., thrust recovery). In some examples, one or more flow control member may be disposed in the passageway 264 to regulate a pressure and/or provide fluid shut-off in the passageway 264.

In operation, the turbine 234 of the illustrated example receives high-pressure bleed air from the HPC 212 of the engine 200. The turbine 234 operates the compressor 232, which receives low-pressure bleed air from the LPC 210 of the engine 200 and compresses the low-pressure bleed air to a relatively higher pressure bleed air to supply the system 228 of the aircraft.

In the illustrated example, the compressor 233 is also operated by a drive shaft 266 (e.g., a radial drive shaft, a second drive shaft, a secondary drive shaft) that is operatively coupled to and driven by the engine 200. In some examples, the drive shaft 266 may be used to power the compressor 232 during certain flight conditions (e.g., during cruise) and the turbine 234 of the turbo-compressor 230 may be used to operate the compressor 232 in other flight conditions (e.g., during idle). During certain operating conditions, the drive shaft 266 of the illustrated example provides power to the compressor 232 more efficiently than the turbine 234 of the turbo-compressor 230. Thus, using the drive shaft 266 to power the compressor 232 during certain flight conditions significantly increases the efficiency of the aircraft 100 (e.g., by using less fuel).

In the illustrated example, a first end 268 of the drive shaft 266 is operatively coupled to the engine 200. Specifically, the first end 268 of the drive shaft 266 is operatively couple to a first gear 270. The first gear 270 is engaged with a second gear 272 that is operatively coupled to the HPC drive shaft 218. In the example shown, the first and second gears 270, 272 are bevel gears and are oriented substantially perpendicular to each other. A second end 274 of the drive shaft 266 is operatively coupled to a gearbox 276 (e.g., a transfer case). The compressor 232 is operatively coupled to the gearbox 276. In particular, in the illustrated example, the shaft 250 of the turbo-compressor 230 is operatively coupled to and powered via the gearbox 276. As the HPC drive shaft 218 (e.g., the engine's high speed shaft) rotates about its longitudinal axis, the second gear 272, which is engaged with the first gear 270, rotates the first gear 270 and, thus, the drive shaft 266 about its longitudinal axis. As a result, the drive shaft 266 powers the gearbox and, thus, operates the compressor 232 via the shaft 250.

In the illustrated example, a clutch is 278 is disposed between the gearbox 276 (e.g., an output or offtake of the gearbox) and the shaft 250 of the turbo-compressor 230 that drives the compressor 232. The clutch 278, which includes an actuation mechanism (e.g., a solenoid, an actuator, etc.), is employed to disengage the shaft 250 (and, thus, the compressor 232) from the gearbox 276. In some examples, the clutch 278 is operated via an electric or hydraulic actuation mechanism. In the illustrated example, a constant gear ratio (e.g., a fixed gear ratio, a fixed speed ratio) is employed between the HPC drive shaft 218 and the compressor 232. The first and second gears 270, 272, along with the gear train inside the gearbox 276, may be sized (e.g., based on the relative ratios between the gears) to enable the compressor 232 to boost the bleed air extracted from the bleed air port 238 to a pressure demanded by the system 228. For example, the gear ratio may be configured based on the parameters (e.g., engine speed, altitude, demand of the system, etc.) of a particular flight condition (e.g., cruise) in which the aircraft operates, so that the drive shaft 266 can provide power to the compressor 232 during a majority of the flight mission. In some examples, the compressor 232 boosts the bleed air from the LPC 210 by a factor of 2.5, which meets the demands of the system 228. The compressor 232 may be, for example, a centrifugal compressor, an axial compressor or a mixed-flow compressor. Additionally, to account for varying inflow conditions (e.g., pressure fluctuations) and varying outflow demands, in some examples the compressor 232 includes variable geometry features such as inlet guide vanes and/or diffuser guide vanes to enable the compressor 232 to handle a range of variability in the inlet conditions and the outlet demands. For example, the pressure increase demanded by the system 228 when the aircraft is operating at a first altitude (e.g., 31,000 feet (ft)) may be less than the pressure increase demanded by the system 228 at a second altitude (e.g., 39,000 ft). Thus, in some examples, the guide vanes may be adjusted to achieve a higher or a lower air flow and/or pressure at the compressor outlet 242. In other examples, a vane-less diffuser or system having a ported shroud may be employed to account for varying inflow conditions and outflow demands.

In an example operation, the drive shaft 266 is used to operate the compressor 232 during a first flight condition(s) such as, for example, during cruise. In some examples, operating the compressor 232 via the drive shaft 266 is more efficient than operating the compressor 232 via the turbine 234. Therefore, as mentioned above, the ratio between the first and second gears 270, 272 and the gears within the gearbox 276 may be selected to provide sufficient power to the compressor 232 during cruise, which often accounts for a majority of the flight mission and, thus, decreases fuel consumption. However, in some examples where the drive shaft 266 is in a fixed gear relationship with the HPC shaft 218, the drive shaft 266 may not be able to provide sufficient power to the compressor 232 when the engine 200 is operating in a second flight condition(s) such as, for example, while the engine 200 is at idle or during descent. At idle or descent the engine 200 is rotating or operating at a relatively slower speed than during cruise. In such a condition, the drive shaft 266 may not provide sufficient power to the compressor 232 to meet the demands of the system 228. Therefore, the turbine 234 of the turbo-compressor 230 may be employed to provide power to the shaft 250 and, thus, to the compressor 234 to provide pressurized air to the system 228 of the aircraft. In such an example, the flow control members 258, 260 are moved to an open position to provide pressurized bleed air to the turbine 234 and the clutch 276 is used to disengage the shaft 250 from the gearbox 276 (to allow the shaft 250 of the turbo-compressor 230 to operate at a greater number of revolutions per minute (RPMs) than the output or offtake of the gearbox 276). Thus, the clutch 278 is employed to selectively engage/disengage the drive shaft 250 and the gearbox 276 depending on the operating condition of the aircraft.

In some examples, the gearbox 276 is operatively coupled to one or more other systems or components used in the aircraft such as, for example, an electrical generator, a hydraulic pump, a fuel pump, etc. Additionally, although the second gear 272 is shown as operatively coupled to the HPC drive shaft 218 in the illustrated example, in other examples the second gear 272 may be operatively coupled to and driven by the LPC drive shaft 216 or any other drive shaft of the engine 200. In some examples, the compressor 232 and/or the gearbox 276 are disposed within the nacelle of the engine 200. In some such examples, the gearbox 276 is coupled (e.g., mounted) to the fan case, and the compressor 232 and the gearbox 276 are disposed within the fan compartment. In other such examples, the gearbox 276 is coupled to the core case of the engine 200, and the compressor 232 and gearbox 276 are disposed within the core compartment.

In some examples, the temperature of the bleed air supplied by the bleed air port 238 is greater than a threshold temperature of the system 228. Therefore, in some examples, an optional heat exchanger or precooler 280 may be employed to reduce the temperature of the bleed air prior to entering the compressor inlet 236. The optional precooler 280 and its associated components are shown in dashed lines. As shown, the precooler 280 of the illustrated example is disposed in the passageway 240, and the bleed air in the passageway 240 flows between a precooler inlet 282 and a precooler outlet 284. To cool the bleed air, the precooler 280 receives air via a passageway or conduit 286. In some examples, the cooler air is provided by the fan 204 of the engine 200 (e.g., at the fan intake section 206). The cooler air flows through the precooler 280 between an inlet 288 and an outlet 290 and, thus, reduces the temperature of the bleed air flowing between the precooler inlet 282 and the precooler outlet 284. Additionally, similar to the air exiting the turbine outlet 262, the air exiting the outlet 290 of the precooler 280 may be dumped overboard, may be used to supply air to the anti-icing systems, and/or may be directed onto the turbines 220, 222 and/or the casing of the engine to help cool the engine 200.

In some examples, the bleed air system 202 may also employ a flow control member 292 (e.g., a three-way valve, a three-way pressure regulating valve). The flow control member 292 may divert bleed air around the precooler 280 via a bypass passageway or conduit 294. Therefore, in some examples, depending on the temperature demand of the system 228, the flow control member 292 may divert bleed air through the precooler 280 and/or around the precooler 280 via the passageway 294.

In some examples, the temperature of the bleed air provided by the bleed air port 238 may be too low. In the illustrated example, a flow control member 291 (e.g., an add heat valve) is integrated into the compressor 242 to divert a portion of the compressed air back to the compressor inlet 236 to mix with the cooler air and thus, increase the temperature of the bleed air entering the compressor 232. In other examples, the flow control member 291 (e.g. an add heat valve) is disposed in the passageway 246, with its output fluidly connected to the compressor inlet 236.

The example bleed air system 202 of the illustrated example may employ a control system 293 to operate the various instruments (e.g., the flow control members 248, 258, 260, 291 (and 292), the clutch 278, etc.). The control system 293 of the illustrated example includes a microprocessor 294, an input/output module 295, a comparator 296, and an instrument controller 297. For example, a sensor 298 downstream of the compressor outlet 242 may provide a signal (corresponding to a pressure of the bleed air prior to flowing to the system 228) to the microprocessor 294 via the input/output module 295. The control system 293 may determine if the downstream pressure measured by the sensor 298 is within a predetermined pressure range (e.g., a threshold pressure, a pressure demand) for a given altitude, aircraft speed, passenger count, icing condition or any other condition affecting the operation of the aircraft system 228. For example, the comparator 296 may compare the signal provided by the sensor 298 with a pressure threshold or range provided, for example, by a look-up table. For example, at cruise conditions, the clutch 278 may be employed to operatively couple the drive shaft 266 and the compressor 232 such that the HPC shaft 218 is providing power to operate the compressor 232 to provide compressed bleed air to the system 228. If the pressure falls outside of the range (e.g., below the threshold pressure), the instrument controller 297 of the control system 293 may cause the flow control member 258 and/or the flow control member 260 to move to an open position to provide bleed air to the turbine 234 and, thus, to provide power to the compressor 232. In such an example, the instrument controller 297 of the control system 293 may also control the clutch 278 to disengage the shaft 250 from the gearbox 276 so the compressor may be driven solely by the power from the turbine 234. The instrument controller 297 of the control system 293 may similarly cause the flow control members 248, 291, 292 to regulate the flow of fluid through the respective passageways or systems. Additionally or alternatively, the control system 293 may be part of (or at least in communication with) a main control system 299 of the aircraft.

Figure 3:
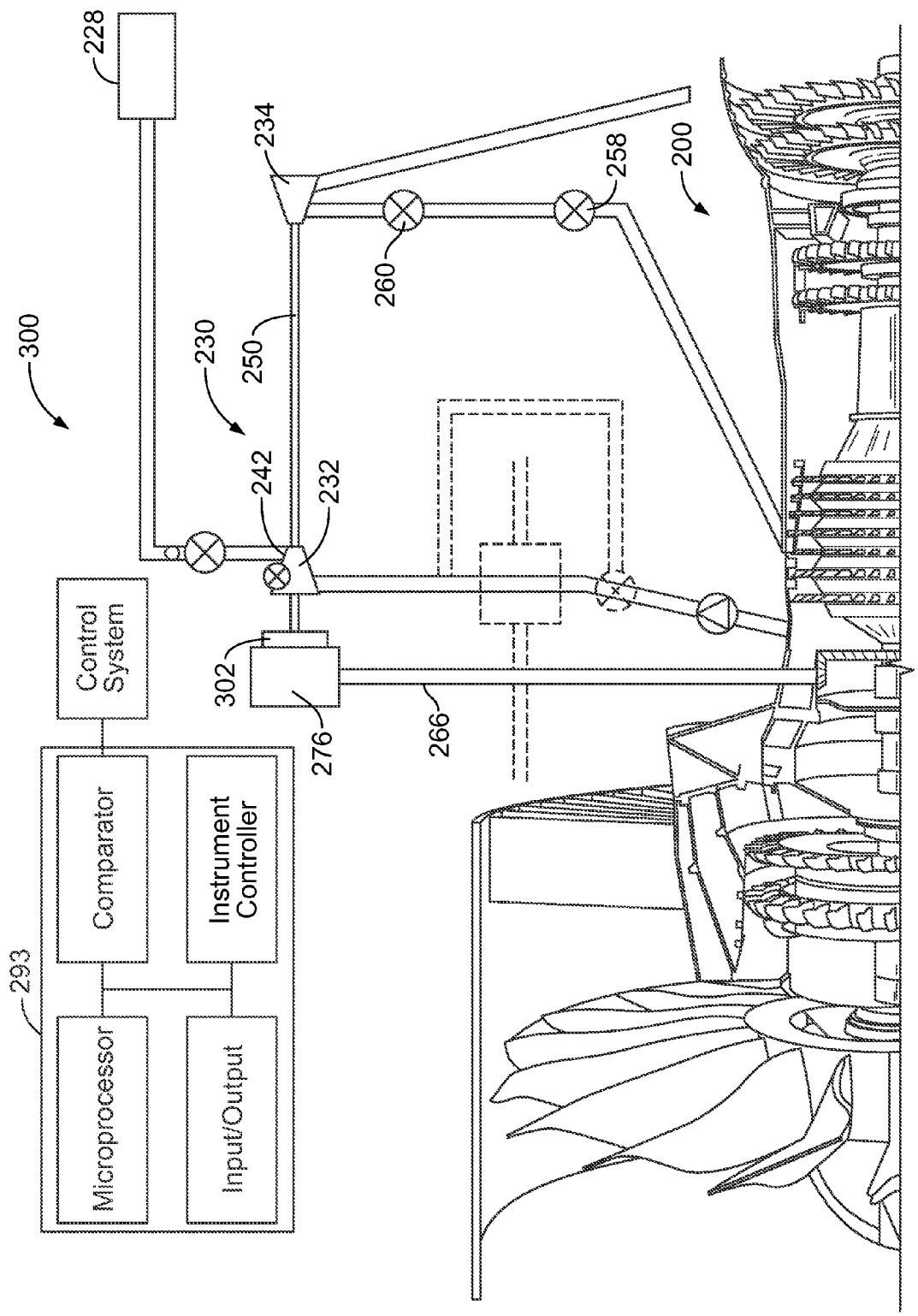
FIG. 3 illustrates another aircraft engine having another example bleed air system disclosed herein.

FIG. 3 illustrates another example bleed air system 300 described herein. Those components of the example bleed air system 300 that are substantially similar or identical to the components of the example bleed air system 202 described above in connection with FIG. 2 and that have functions substantially similar or identical to the functions of those components will not be described in detail again below. Instead, the interested reader is referred to the above corresponding descriptions. To facilitate this process, similar reference numbers will be used for like structures.

Referring to FIG. 3, the example bleed air system 300 employs a freewheel 302 (e.g., a ratchet and pawl mechanism) between the gearbox 276 and the shaft 250 of the turbo-compressor 230. As mentioned above, in some examples the engine 200 may not be operating at a high enough speed or RPM to provide sufficient speed to the compressor 232 via the drive shaft 266 and gearbox 276. In such an instance, the turbine 234 of the turbo-compressor 230 may be employed to provide power to the compressor 232 via the shaft 250. To prevent the shaft 250 from being coupled to and powering the drive shaft 266, the example bleed air system 202 shown in FIG. 2 employs a clutch to disengage the shaft 250 from the gearbox 276. However, in the example shown in FIG. 3, the freewheel 302 enables the shaft 250 to rotate faster than the output or offtake from the gearbox 276 and, thus, the shaft 250 does not power the gearbox 276 and/or the shaft 266. Additionally, the freewheel 302 does not employ additional actuation components and, thus, is less complex than the clutch 278.

Figure 4:
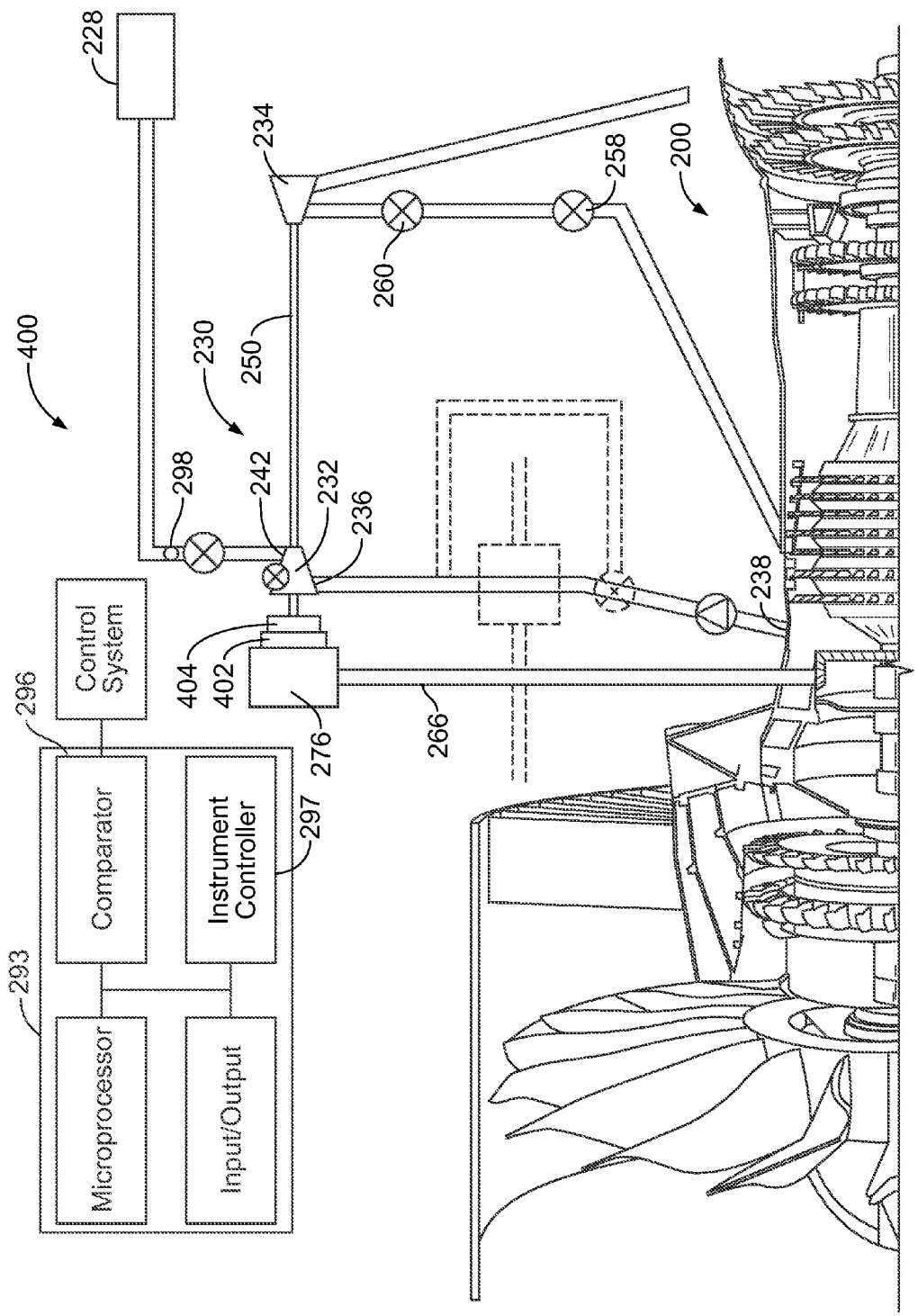
FIG. 4 illustrates another aircraft engine having another example bleed air system disclosed herein.

FIG. 4 illustrates another example bleed air system 400 described herein. Those components of the example bleed air system 400 that are substantially similar or identical to the components of the example bleed air system 202 described above in connection with FIG. 2 and that have functions substantially similar or identical to the functions of those components will not be described in detail again below. Instead, the interested reader is referred to the above corresponding descriptions. To facilitate this process, the same reference numbers will be used for like structures.

In some examples, varying flight conditions such as altitude and cruise speed greatly affect the pressure of the bleed air at the compressor inlet 236 and the pressure demanded by the system 228. To accommodate for such varying inflow and outflow demands, the bleed air system 400 of FIG. 4 employs a variable speed transmission 402 and a freewheel or clutch 404. The variable speed transmission 402 and the freewheel or the clutch 404 are disposed between the gearbox 276 (e.g., the offtake of the gearbox 276) and the shaft 250 of the turbo-compressor 230. The transmission 402 operates to change the speed of the shaft 250 to provide sufficient pressure increase at the compressor outlet 242. In the illustrated example, the transmission 402 enables compressor 232 to be powered by the drive shaft 266 through a greater number of a flight conditions such as, for example, during cruise, climb and takeoff flight conditions and/or, for example, during other flight condition(s) requiring a thrust below cruise but above idle. The clutch or the freewheel 404 may be employed to operate similarly to the clutch 278 and/or the freewheel 302 described above. In particular, the clutch or the freewheel 404 provide a mechanism to disengage the shaft 250 from the gearbox 276 when the turbine 234 is providing power to the compressor 232 such as, for example, during idle.

In an example operation, the sensor 298 may be employed to detect or measure the pressure and/or temperature of the bleed air downstream from the compressor outlet 242 and generate a signal corresponding to the measured pressure and/or temperature to the control system 293. The control system 293 receives the signal from the sensor 298 and may be configured to compare the measured pressure and/or temperature to a threshold value via the comparator 296. For example, if bleed air is being supplied to the compressor inlet 236 by the bleed air port 238 of the LPC 210, and the pressure of the bleed air is at the compressor outlet 242 is less than a threshold value demanded by the system 228, the control system 293 may control the transmission 402 (e.g., via the instrument controller 297) to switch to a different gear or different speed ratio to operate the compressor a relatively greater speed or flow rate and, thus, provides sufficient power to boost the bleed air to meet the demand of the system 228.

Figure 5:
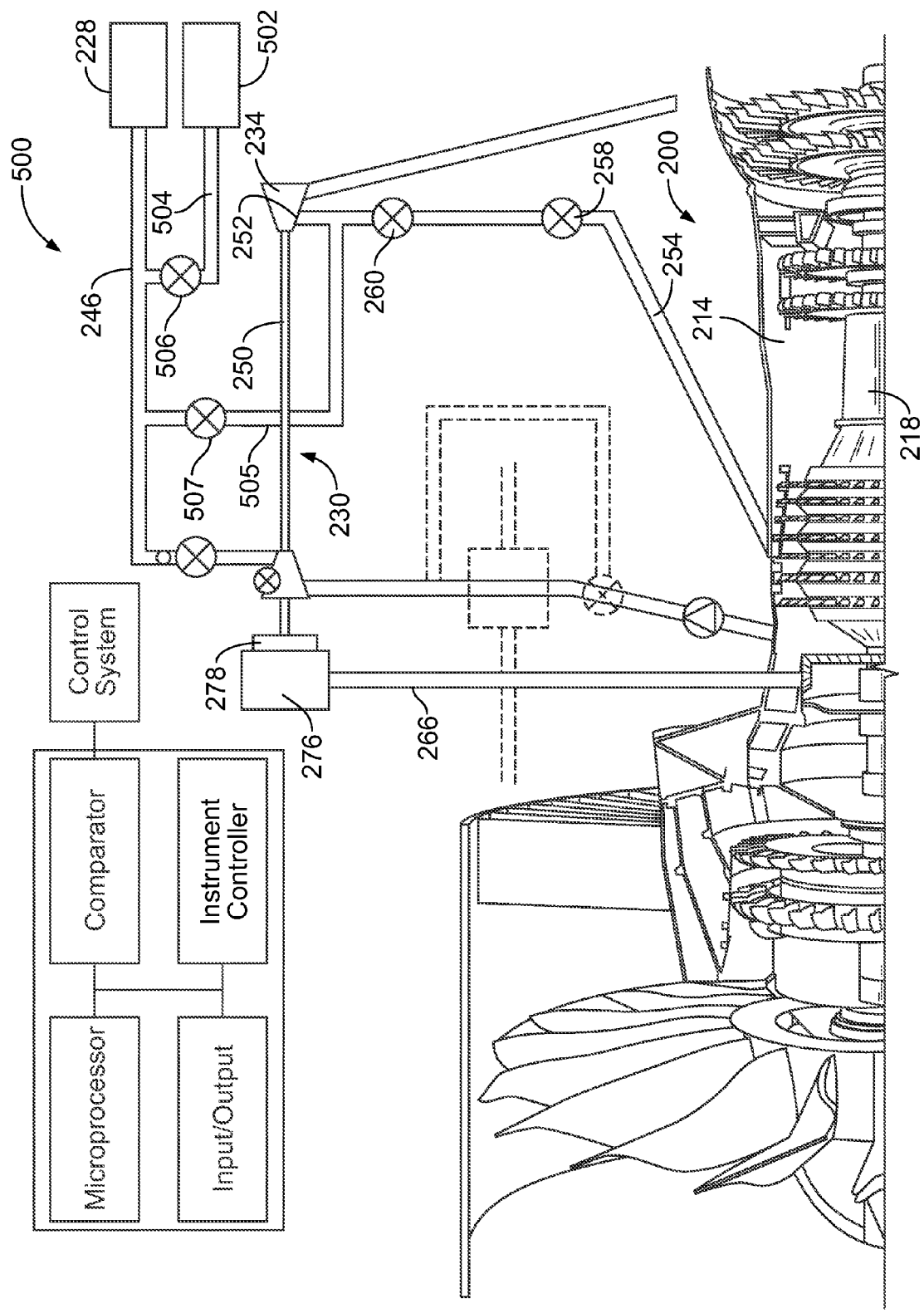
FIG. 5 illustrates another aircraft engine having another example bleed air system disclosed herein.

FIG. 5 illustrates another example bleed air system 500 described herein. Those components of the example bleed air system 500 that are substantially similar or identical to the components of the example bleed air system 202 described above in connection with FIG. 2 and that have functions substantially similar or identical to the functions of those components will not be described in detail again below. Instead, the interested reader is referred to the above corresponding descriptions. To facilitate this process, similar reference numbers will be used for like structures.

Some known aircraft engines use a starter to start the engine. These starters typically include a radial inflow turbine and a clutch or solenoid to engage the starter shaft with a gearbox (e.g., the gearbox 276). To start the engine, high pressure air is supplied to the starter turbine, causing the engine shaft to spin.

The example bleed air system 500 of FIG. 5 utilizes the turbine 234 of the turbo-compressor 230 to start the engine 200. In the illustrated example, a high pressure air source 502 is fluidly coupled to the turbine 234 of the turbo-compressor 230. In particular, the high pressure air source 502 provides high pressure air to the turbine inlet 252 via a passageway or conduit 504 and a passageway or conduit 505. The passageway 504 fluidly couples the high pressure air source 502 to the passageway 246, and the passageway 505 fluidly couples the passageway 246 to the passageway 254 downstream of the second flow control member 260. In the illustrated example, a flow control member 506 is disposed within the passageway 504 that operates to direct high pressure air into the passageway 246 and a flow control member 507 is disposed within the passageway 505 to direct high pressure air in the passageway 246 to the passageway 254 upstream of the turbine inlet 252. Thus, the high pressure air source 502 provides high pressure air to the turbine 234 and/or the system 228. The flow control members 506, 507 may be configured to regulate the pressure of high pressure air to a pre-set or predetermined pressure value and/or provide fluid flow shut-off (e.g., a PRV, a PRSOV, an SOV, a HPSOV).

In an example operation, the flow control members 258, 260 are closed and the flow control members 506, 507 are moved to open positions to supply the high pressure air from the high pressure air source 502 to the turbine inlet 252. The high pressure air powers the turbine 234, which rotates the shaft 250, which is operatively coupled to the gearbox 276 (e.g., via the clutch 278), which rotates the drive shaft 266 and, thus, rotates the HPC shaft 218 of the engine 200. Once the HPC shaft 218 is spinning, fuel is mixed in the combustion chamber 214 and a spark is provided to ignite the mixture and start the engine 200. The high pressure air source 502 may include, for example, high pressure air generated by an auxiliary power unit or provided by a ground cart. Thus, unlike known systems, the example bleed air system 500 does not require an additional or separate starter but, instead, advantageously utilizes the turbo-compressor to start the engine 200.

Figure 6:
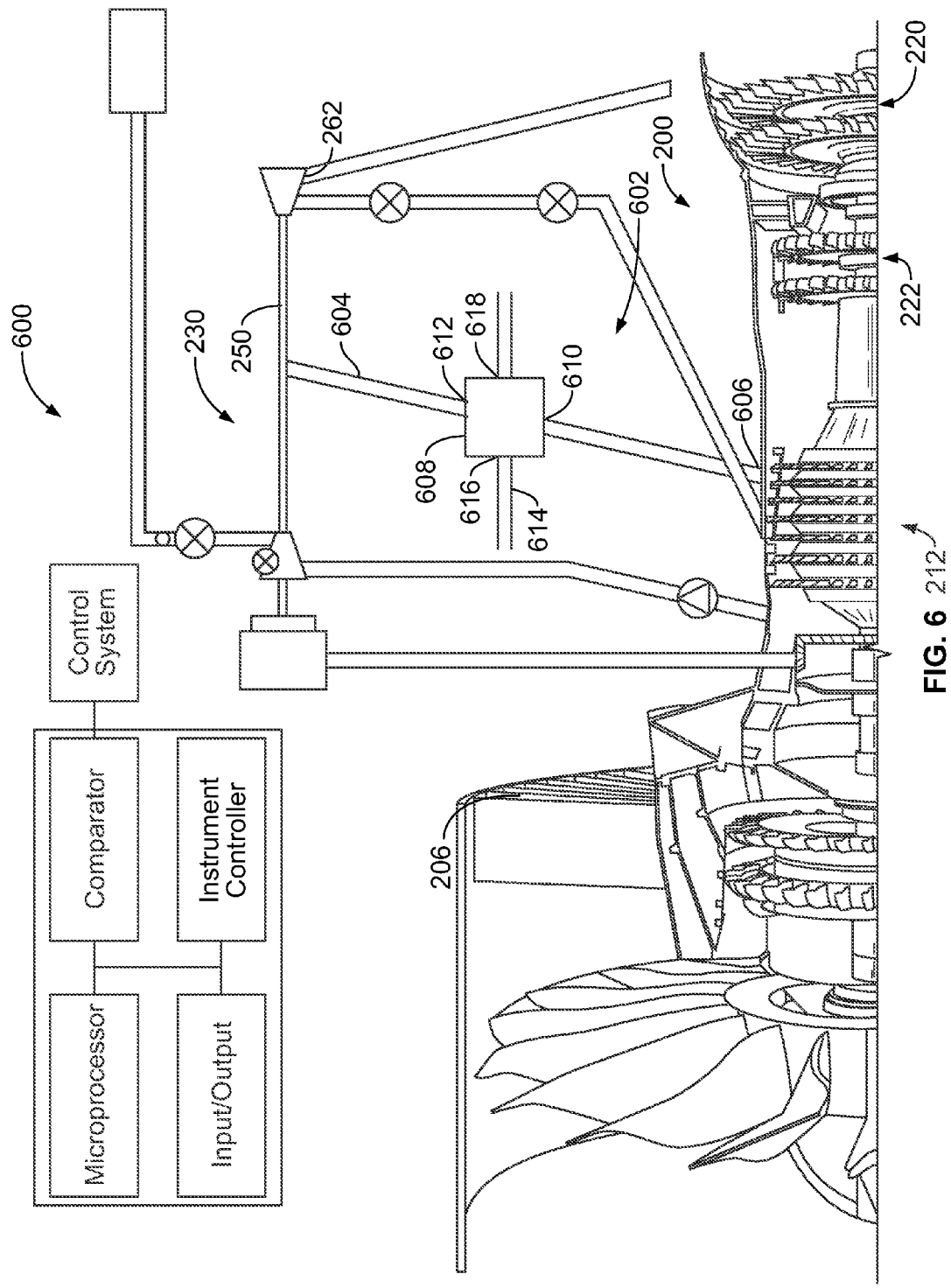
FIG. 6 illustrates another aircraft engine having another example bleed air system disclosed herein.

FIG. 6 illustrates another example bleed air system 600 described herein. Those components of the example bleed air system 600 that are substantially similar or identical to the components of the example bleed air system 202 described above in connection with FIG. 2 and that have functions substantially similar or identical to the functions of those components will not be described in detail again below. Instead, the interested reader is referred to the above corresponding descriptions. To facilitate this process, similar reference numbers will be used for like structures. Additionally, in the illustrated example of FIG. 6, the operational precooler 280 and its associated components have been removed for clarity. However, it is understood that the example aspects of the bleed air system 600 may be combined with one or more of the aspects of any of the systems 202, 300, 400 and 500.

In the illustrated example of FIG. 6, the example bleed air system 600 includes an air bearing system 602 to provide pressurized air for the air bearings of the shaft 250. A passageway or conduit 604 fluidly couples a bleed air port of the engine 200 and the bearings of the shaft 250 of the turbo-compressor 230. In particular, in the example shown, the passageway 604 is fluidly coupled to a bleed air port 606 at a mid-stage of the HPC 212. However, in other examples, the air bearing system 602 may extract or divert air from another stage of the HPC 212.

In the illustrated example, the pressurized air extracted from bleed air port 606 provides a layer of air for the air bearings. Air bearings, while allowing the shaft 250 to rotate with minimal wear or friction, are advantageous and result in less wear and friction than other known lubricated type bearings. In some examples, air bearings also assist in reducing vibrations in the shaft 250. In some examples, a heat exchanger or precooler 608 may be employed to reduce the temperature of the bleed air supplied to the air bearings. In the illustrated example, the bleed air in the passageway 604 flows between a precooler inlet 610 and a precooler outlet 612. To cool the bleed air, the precooler 608 receives air provided by a passageway or conduit 614 that flows through the precooler 608 between an inlet 616 and an outlet 618. The relatively cooler air in the passageway 614 may be provided by, for example, the fan intake section 206 and/or ambient air. The cooler fan air flowing between the inlet 616 and the outlet 618 reduces the temperature of the bleed air flowing between the precooler inlet 610 and the precooler outlet 612. Additionally or alternatively, one or more flow control members and/or bypass passageways may be used in conjunction with the precooler 608 to operate and cool the bleed air provided to the air bearings.

Additionally, in the example bleed air systems 202, 300, 400, 500, 600 described above, the control system 293 may operate the various flow control members 248, 258, 260, 291, 292, 506, 507, the clutch 276 and/or the transmission 402 based on the operating conditions of the engine 200. For example, during operation, different engine speeds and/or different altitudes significantly vary the pressure and/or temperature of the bleed air provided by the LPC 210 and the HPC 212. For example, during high-thrust operation, the pressure of the bleed air provided both the LPC 210 and the HPC 212 is significantly higher than the pressure of the bleed air provided when the engine 200 is at idle. Therefore, the control system 293 may receive indication of the operating parameters or conditions (from the various sensors and/or main control system 299) of the engine 200 and may operate the various flow control members 248, 258, 260, 291, 292, 506, 507, the clutch 276 and/or the transmission 402 accordingly.

While an example manner of implementing the control system 293 is illustrated in FIGS. 2-6, one or more of the elements, processes and/or devices illustrated in FIGS. 2-6 may be combined, divided, re-arranged, omitted, eliminated and/or implemented in any other way. Further, the example microprocessor 294, the example input/output 295, the example comparator 296, the example instrument controller 297 and/or, more generally, the example control systems 293, 299 of FIGS. 2-6 may be implemented by hardware, software, firmware and/or any combination of hardware, software and/or firmware. Thus, for example, any of the example microprocessor 294, the example input/output 295, the example comparator 296, the example instrument controller 297 and/or, more generally, the example control systems 293, 299 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, microprocessor 294, the example input/output 295, the example comparator 296, the example instrument controller 297 is/are hereby expressly defined to include a tangible computer readable storage device or storage disk such as a memory, a digital versatile disk (DVD), a compact disk (CD), a Blu-ray disk, etc. storing the software and/or firmware. Further still, the example control systems 293, 299 of FIGS. 2-6 may include one or more elements, processes and/or devices in addition to, or instead of, those illustrated in FIGS. 2-6, and/or may include more than one of any or all of the illustrated elements, processes and devices.

Figure 7:
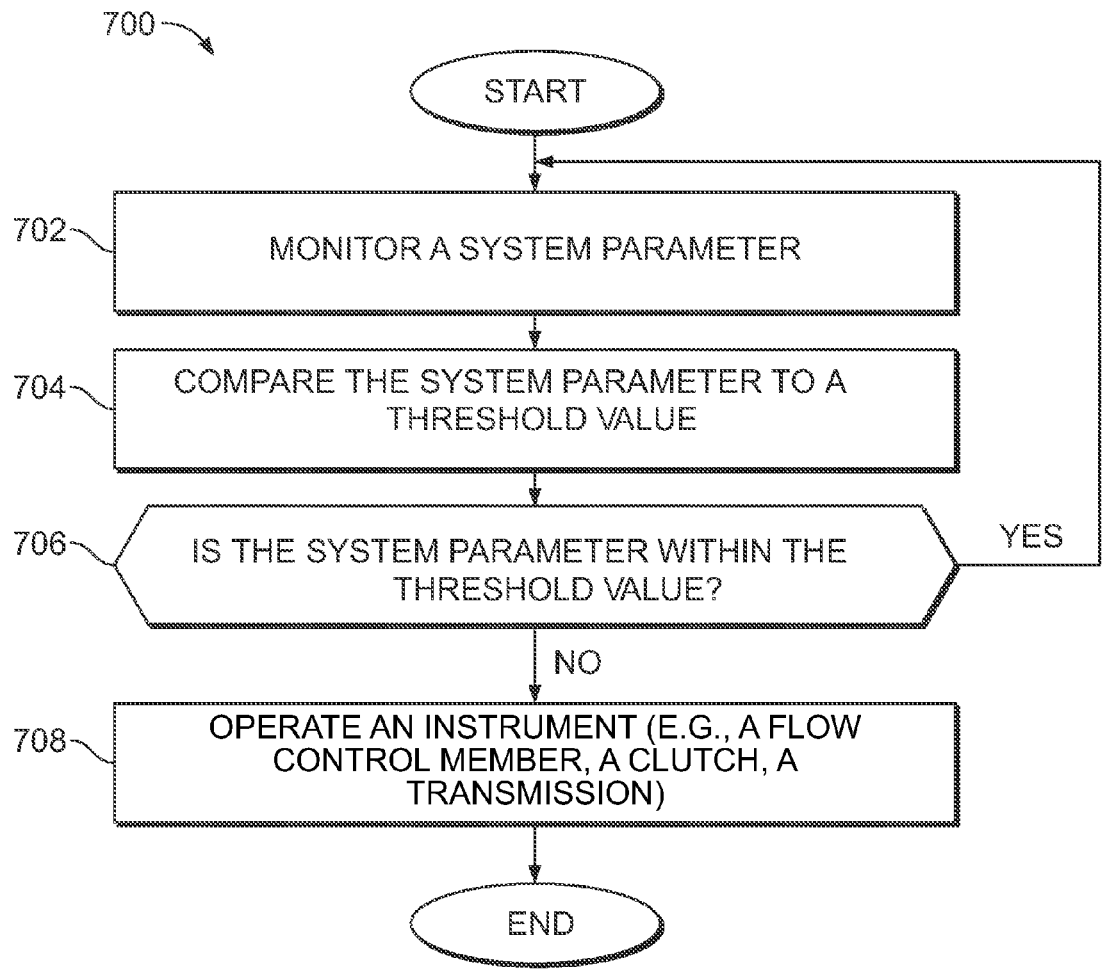
FIG. 7 is a flowchart representative of an example method that may be performed by the example bleed air systems of FIGS. 2-6.
Figure 8:
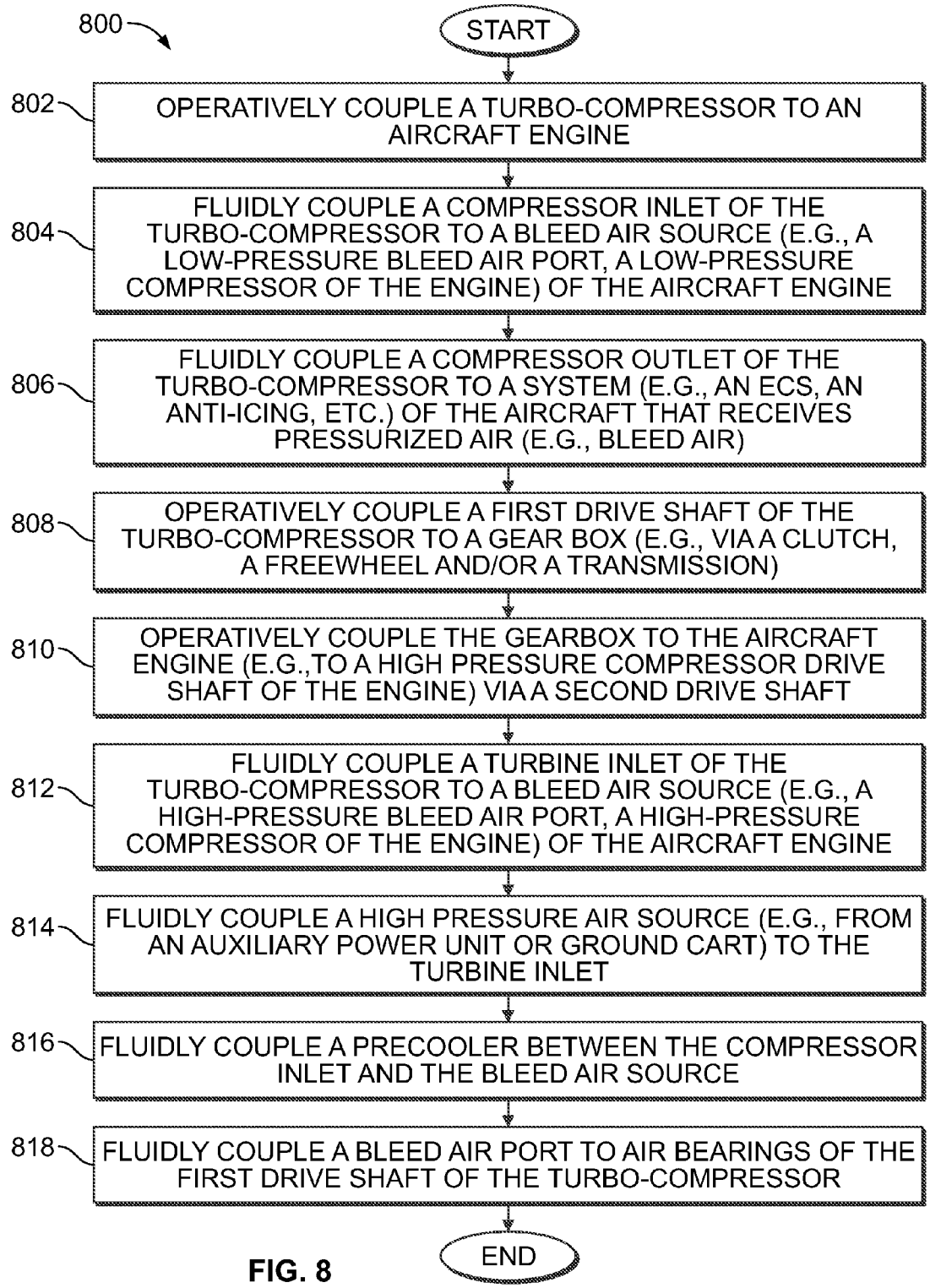
FIG. 8 is a flowchart illustrating a method of implementing the example bleed air systems of FIGS. 2-6.

FIGS. 7 and 8 are flowcharts representative of example methods that may be implemented with an example bleed air system such as, for example, the bleed air systems 202, 300, 400, 500 and/or 600 of FIGS. 2-6 and/or a control system such as the control system 293 of FIGS. 2-6. The methods may be implemented using machine readable instructions that comprise a program for execution by a processor such as the processor 294 shown in the example control system 293 of FIGS. 2-6. The program may be embodied in software stored on a tangible computer readable storage medium such as a CD-ROM, a floppy disk, a hard drive, a digital versatile disk (DVD), a Blu-ray disk, or a memory associated with the processor 294 and/or the control system 293, but the entire program and/or parts thereof could alternatively be executed by a device other than the processor 294 and/or the control system 293 and/or embodied in firmware or dedicated hardware. Further, although the example program is described with reference to the flowcharts illustrated in FIGS. 7 and 8, many other methods of implementing the example microprocessor 294, the example input/output 295, the example comparator 296, the example instrument controller 297 and/or, more generally, the example control systems 293, 299 may alternatively be used. For example, the order of execution of the blocks may be changed, and/or some of the blocks described may be changed, eliminated, or combined.

As mentioned above, the example methods of FIGS. 7 and 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7 and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

For purposes of discussion, the example method 700 of FIG. 7 is described in connection with the example control system 293 and the example instrument controller 297. In this manner, each of the example operations of the example method 700 of FIG. 7 is an example manner of implementing a corresponding one or more operations performed by one or more of the blocks of the example control system 293 or the instrument controller 297 of FIGS. 2-6.

Turning in detail to FIG. 7, the control system 293 monitors a system parameter of a bleed air system (block 702). For example, the control system 293 may be configured to monitor one or more system parameters of the example bleed air systems 202, 300, 400, 500 and/or 600 disclosed herein. To monitor a system parameter, the control system 293 receives one or more signals from sensors (e.g., the sensor 298) throughout the bleed air system and/or main control system 299. For example, a system parameter may include a pressure of bleed air, a temperature of the bleed air, a speed of the engine 200, an altitude of the aircraft, etc. The control system 293 receives the signals via the input/output module 295.

The control system 293 compares the system parameter to a threshold value (block 704). For example, the control system 293 can compare, via the comparator 296, the pressure and/or temperature of the bleed air received via the sensor(s) to respective threshold values retrieved from a look-up table or storage or with the other values received by the sensors. In some examples, the system parameter and/or the threshold value may be based on other operating conditions of the aircraft.

The control system 293 may then determine if the system parameter measured by, for example, the sensor(s) is within the threshold value (block 706). If the system parameter is within the threshold value, then the control system 293 returns to block 702 to continue monitoring the system parameter. For example, in the bleed air system 202 of FIG. 2, the drive shaft 266 may be providing power to the compressor 232 via the gearbox 276 and the clutch 278, and the flow control members 258, 260 may be closed to prevent bleed air from powering the turbine 234. If the pressure of the bleed air at the compressor outlet 242 is substantially equal to the pressure demanded by the system 228, the control system 293 may continue to allow the drive shaft 266 to power the compressor and may continue to keep the flow control members 258, 260 in a closed position.

If the control system 293 determines that the system parameter is not within the threshold value, then the control system 293 commands the valve controller 296 to operate a flow control member (block 708). For example, in the bleed air systems 202 of FIG. 2 and 300 of FIG. 3, if the pressure of the bleed air at the compressor outlet 242 is not substantially equal to (e.g., below) the pressure demanded by the system 228, the control system 293 may cause the flow control members 258, 260 to move to an open position to allow pressurized bleed air to operate the turbine 234 and, thus, provide power to the compressor to meet the demands of the system 228. In regards to the example system 202 of FIG. 2, the control system 293 may also cause the clutch 278 to disengage the shaft 250 from the offtake of the gearbox 276. In some examples, such as the example bleed air system 400 of FIG. 4, the control system 293 may control the transmission 402 to switch gears or change the speed ratio and, thus, change the speed and flow rate of the compressor 232. The control system 293 may also be employed to similarly control, for example, the temperature of the bleed air via the precooler 280 and the flow control member 292, the engine start operations disclosed above in the bleed air system 500 of FIG. 5, etc.

FIG. 8 is a flowchart of an example method 800 of implementing the example bleed air systems 202, 300, 400, 500 and/or 600 in accordance with the teachings of this disclosure. While an example manner of implementing the example bleed air systems, one or more of the blocks and/or processes illustrated in FIG. 8 may be combined, divided, re-arranged, omitted, eliminated and/or implemented in any other way. Further still, the example method of FIG. 8 may include one or more processes and/or blocks in addition to, or instead of, those illustrated in FIG. 8, and/or may include more than one of any or all of the illustrated processes and/or blocks. Further, although the example method 800 is described with reference to the flow chart illustrated in FIG. 8, many other methods of implementing a bleed air system may alternatively be used.

Referring to FIG. 8, a turbo-compressor is operatively coupled to an aircraft engine (block 802). The turbo-compressor includes a turbine and a compressor, which provides pressurized bleed air to one or more systems of the aircraft that receive pressurized air. For example, in the example bleed air systems 202, 300, 400, 500 and 600 disclosed above, the turbo-compressor 230 is operatively coupled to the engine 200 (e.g., in the nacelle). The compressor 232 of the turbo-compressor 230 provides pressurized air to the system 228 of the aircraft.

In the example method 800 of FIG. 8, a compressor inlet of the turbo-compressor is fluidly coupled to a bleed air source (e.g., a low-pressure bleed air port, a low-pressure compressor of the engine) of the aircraft engine (block 804). In the example bleed air systems 202, 300, 400, 500 and 600 disclosed above, the compressor inlet 236 is fluidly coupled, via the passageway 240, to the bleed air port 238, which is a final stage of the LPC 210 and provides bleed air having a relatively lower pressure than the HPC 212. In other examples, the compressor inlet 236 may receive bleed air from other stages of the LPC 210 and/or the HPC 212.

In the example method 800 of FIG. 8, a compressor outlet of the turbo-compressor is fluidly coupled to control system of the aircraft that receives bleed air supply (block 806). Thus, the compressor boosts bleed air from the engine to supply pressurized air to the systems of the aircraft. In the example bleed air systems 202, 300, 400, 500 and 600 disclosed above, the compressor outlet 242 is fluidly coupled, via the passageway 246, to the system 228. The system 228 may include, for example, an ECS, a wing anti-icing system, an engine anti-icing system and/or any other system of the aircraft that utilizes pressurized air.

In the example method 800 of FIG. 8, a first shaft or drive shaft of the turbo-compressor is operatively coupled to a gearbox (block 808). In some examples, a clutch, a freewheel and/or a transmission may be employed to operatively couple the first drive shaft of the turbo-compressor to the gearbox. The gearbox is to provide power to the compressor to operate the compressor to supply pressurized air to the system of the aircraft. In the example bleed air systems 202, 300, 400, 500 and 600 disclosed above, the shaft 250 of the turbo-compressor 230 is operatively coupled to the gearbox 276. Specifically, in the example bleed air system 202 of FIG. 2, the clutch 278 is disposed between the shaft 250 and the offtake of the gearbox 276. The clutch 278 is utilized to engage and disengage the shaft from the gearbox 276 depending on the operating condition of the aircraft. Further, in the example bleed air system 400 of FIG. 4, the transmission 402 is operatively coupled between the shaft 250 and the gearbox 276. The transmission 402 allows the drive shaft 266 and the gearbox 276 to supply power to the compressor 232 over a greater range of flight conditions because the transmission 402 is capable of adjusting the output speed to the compressor 232 rather than being in a fixed gear or direct relationship with the HPC drive shaft 218. Additionally, in still other examples, such as the example bleed air system 300 of FIG. 3, the freewheel 302 is utilized to enable the turbine 234 to power the compressor 232 without having to disconnect the shaft 250 from the gearbox 276. The freewheel 302 allows the shaft 250 to rotate faster than the offtake of the gearbox 276.

In the example method 800 of FIG. 8, the gearbox is operatively coupled to and is to be driven by a second drive shaft (e.g., a radial drive shaft) that is operatively coupled to the engine (block 810). In some examples, the second drive shaft is coupled to the drive shaft of the engine (e.g., the high-pressure compressor drive shaft) via bevel gears. As the drive shaft of the engine rotates, the second drive shaft rotates and, thus, operates the gearbox and the compressor when the compressor is coupled to the gearbox. In the example bleed air systems 202, 300, 400, 500 and 600 disclosed above, the drive shaft 266 is operatively coupled to the HPC drive shaft 218 of the engine 200 and to the gearbox 276 to provide power to the gearbox 276. In the illustrated examples, the drive shaft 266 is operatively coupled to the HPC drive shaft 218. However, in other examples, the drive shaft 266 may be operatively coupled to and driven by the LPC drive shaft 216 or any other drive shaft of the engine 200.

In the example method 800 of FIG. 8, an inlet of the turbine of the turbo-compressor is fluidly coupled to a bleed air source of the aircraft engine (block 812). The bleed air source may be, for example, a bleed air port of the high-pressure compressor (e.g., at an intermediate stage or a final stage). In some examples, the aircraft engine may be operating a relatively lower thrust condition and, as a result, the second drive shaft may not be able to provide sufficient power to the compressor. In such an instance, higher pressure bleed air may be extracted from the aircraft engine to power the turbine and, thus, provide power to the compressor to meet the demands of the system of the aircraft. In the example bleed air systems 202, 300, 400, 500 and 600 disclosed above, the turbine inlet 252 is fluidly coupled to the bleed port 256 at an intermediate stage of the HPC 212 via the passageway 254. At certain operating conditions (e.g., at idle), the drive shaft 266 may not provide sufficient power to the compressor 232 so the turbine 234 may be utilized to provide power to the compressor 232.

In the example method 800 of FIG. 8, a high pressure air source is fluidly coupled to the turbine inlet for starting the aircraft engine (block 814). The high pressure air rotates the turbine of the turbo-compressor, which is operatively coupled to the gearbox and, thus, to the drive shaft of the engine. In the example bleed air system 500 of FIG. 5, a high pressure air source 502 is fluidly coupled to the turbine inlet 252 via the passageways 504, 505. As mentioned above, in some examples the high pressure air source is provided by an auxiliary power supply and/or a ground cart. The high pressure air operates the turbine 234, which is operatively coupled to the gearbox 276 and, thus, to the drive shaft 266 and the engine 200.

In the example method 800 of FIG. 8, a precooler is fluidly coupled between the compressor inlet and the bleed air source (block 816). In some examples, if the temperature of the bleed air extracted by the compressor inlet is too high for the demands of the system, the precooler may be employed to reduce the temperature of the bleed air. For example, in the example bleed air systems of 202, 300, 400, 500 and 600 disclosed above, the precooler 280 may be disposed in the passageway 240 to reduce the temperature of the bleed air prior to entering the compressor inlet 236.

In the example method 800 of FIG. 8, a bleed air source (e.g., a bleed air port of the high-pressure compressor of the engine) is fluidly coupled to air bearings of the turbo-compressor shaft (block 818). Air bearings provide an effective manner to prevent wear and friction between the shaft of the turbo-compressor and the non-rotating support structure for the shaft. In the example bleed air system 600 of FIG. 6, the air bearing system 602 provides pressurized bleed air from an intermediate stage of the HPC 212 to air bearings of the turbo-compressor 230.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A bleed air system for an aircraft comprising:
   a turbo-compressor comprising a compressor, a turbine, and a first drive shaft coupled between the compressor and the turbine, the first drive shaft to enable the turbine to selectively drive the compressor, the compressor having a compressor inlet and a compressor outlet, the compressor outlet to be fluidly coupled to a system of the aircraft that receives pressurized air, the compressor inlet to receive bleed air from a low-pressure compressor of an engine of the aircraft;
   a gearbox operatively coupled to the first drive shaft to drive the compressor, the gearbox operatively coupled to and powered by a second drive shaft extending from the engine; and
   a clutch disposed between the first drive shaft and the gearbox to selectively connect the first drive shaft to the gearbox to enable the engine to drive the turbo-compressor.

2. The bleed air system as defined in claim 1, wherein the system is at least one of an environmental control system or an anti-icing system.

3. The bleed air system as defined in claim 1, wherein the turbine includes a turbine inlet fluidly coupled to a high-pressure compressor of the engine.

4. The bleed air system as defined in claim 1 further comprising a processor to control the clutch to:
   engage the first drive shaft with the gearbox when the aircraft is operating in a first flight condition; and
   disengage the first drive shaft from the gearbox when the aircraft is operating in a second flight condition.

5. The bleed air system as defined in claim 4, wherein the first flight condition occurs when the aircraft is operating at cruise.

6. The bleed air system as defined in claim 5, wherein the second flight condition occurs when the aircraft is operating at idle or during a descent.

7. The bleed air system as defined in claim 1 further comprising a high pressure air source fluidly coupled to a turbine inlet of the turbine, the high pressure air source to be supplied to the turbine inlet to start the engine.

8. The bleed air system as defined in claim 1 further comprising a passageway to fluidly couple a bleed air port of the engine to an air bearing of the first drive shaft, the passageway to provide pressurized air to operate the air bearing.

9. The bleed air system as defined in claim 1, wherein the compressor is to be operatively coupled to the engine via a constant gear ratio.

10. An aircraft comprising:
   a gas turbine engine including a low-pressure compressor and a combustor downstream from the low-pressure compressor;
   a fan disposed upstream from the low-pressure compressor, the fan mechanically coupled to, and driven by, the gas turbine engine;
   a turbo-compressor including:
      a compressor having a compressor inlet fluidly coupled to the low-pressure compressor of the gas turbine engine and a compressor outlet fluidly coupled to a system of the aircraft; and
      a turbine operatively coupled to the compressor to selectively drive the compressor;
   a gearbox operatively coupled to the turbo-compressor; and
   a clutch disposed between the turbo-compressor and the gearbox to selectively connect the turbo-compressor to the gearbox to enable the gas turbine engine to drive the turbo-compressor.

11. The aircraft as defined in claim 10 further comprising a variable speed transmission disposed between the clutch and the gearbox, the variable speed transmission to operate the compressor at a plurality of different speeds.

12. The aircraft as defined in claim 10, wherein the turbo-compressor is operatively coupled to a third drive shaft of a high-pressure compressor of the gas turbine engine.

13. A method comprising:
   coupling a first drive shaft of a turbo-compressor to a gearbox via a clutch, the turbo-compressor comprising a compressor and a turbine operatively coupled via the first drive shaft, the first drive shaft to enable the turbine to selectively drive the compressor;
   coupling the gearbox to a second drive shaft extending from an aircraft engine;
   fluidly coupling a compressor outlet of the compressor to a system of an aircraft that is to receive pressurized air;
   fluidly coupling a compressor inlet of the compressor to a bleed air port of a low-pressure compressor of the aircraft engine; and
   using the clutch to selectively connect the first drive shaft to the gearbox to enable the second drive shaft to power the compressor to supply pressurized air to the system.

14. A method as defined in claim 13, wherein the second drive shaft is used to power the compressor in a first mode, further comprising using the turbine to power the compressor and supply pressurized air to the system in a second mode.

15. A method as defined in claim 13 further comprising using the turbine of the turbo-compressor to start the engine by supplying pressurized air to a turbine inlet to rotate the first drive shaft.

* * * * *

UNITED STATES PATENT AND TRADEMARK OFFICE
CERTIFICATE OF CORRECTION

PATENT NO. : 9,810,158 B2
APPLICATION NO. : 14/242570
DATED : November 7, 2017
INVENTOR(S) : Foutch et al.

It is certified that error appears in the above-identified patent and that said Letters Patent is hereby corrected as shown below:

In the Claims

Column 22, Line 4 (Claim 12): Delete "third".

Signed and Sealed this
Fifteenth Day of May, 2018

Andrei Iancu
*Director of the United States Patent and Trademark Office*